US006929410B2

(12) United States Patent
Nguyen et al.

(10) Patent No.: US 6,929,410 B2
(45) Date of Patent: Aug. 16, 2005

(54) CAMERA SHUTTER (75) Inventors: Vu Nguyen, Goleta, CA (US); Larry Switzer, Santa Barbara, CA (US); Kevin Takeuchi, Santa Barbara, CA (US)

(73) Assignee: Indigo Systems Corporation, Goleta, CA (US)

(*) Notice: Subject to any disclaimer, the term of this patent is extended or adjusted under 35 U.S.C. 154(b) by 12 days.

(21) Appl. No.: 10/745,368

(22) Filed: Dec. 23, 2003

(65) Prior Publication Data
US 2005/0135800 A1 Jun. 23, 2005

(51) Int. Cl.[7] ................................ G03B 9/08
(52) U.S. Cl. ................ 396/463; 396/473; 396/493
(58) Field of Search ................ 396/449, 452, 396/463, 470, 473, 493, 495

(56) References Cited

U.S. PATENT DOCUMENTS

| 3,921,470 A | * | 11/1975 | Mabuchi ................ 74/414 |
| 6,017,156 A | * | 1/2000 | Depatie et al. ............ 396/463 |
| 2002/0021043 A1 | * | 2/2002 | Hagiwara ................ 301/6.5 |

* cited by examiner

Primary Examiner—David M. Gray
(74) Attorney, Agent, or Firm—MacPherson Kwok Chen & Heid LLP; Greg J. Michelson (57) ABSTRACT

Systems and methods are disclosed for providing camera shutter mechanisms. For example, in accordance with an embodiment of the present invention, an improved camera shutter mechanism and techniques for manufacturing the camera shutter mechanism are disclosed.

22 Claims, 8 Drawing Sheets

CAMERA SHUTTER

TECHNICAL FIELD

The present invention relates generally to cameras and, more particularly, to camera shutters.

BACKGROUND

A camera shutter is well known and utilized in a wide variety of camera applications to generally control when electromagnetic radiation reaches the camera's imaging system. For example, a camera shutter may be employed in an infrared camera. The camera shutter may be closed, as an example, when calibrating the infrared detector or to protect the camera from external thermal radiation, such as when the camera is switched off.

Figure 1A:
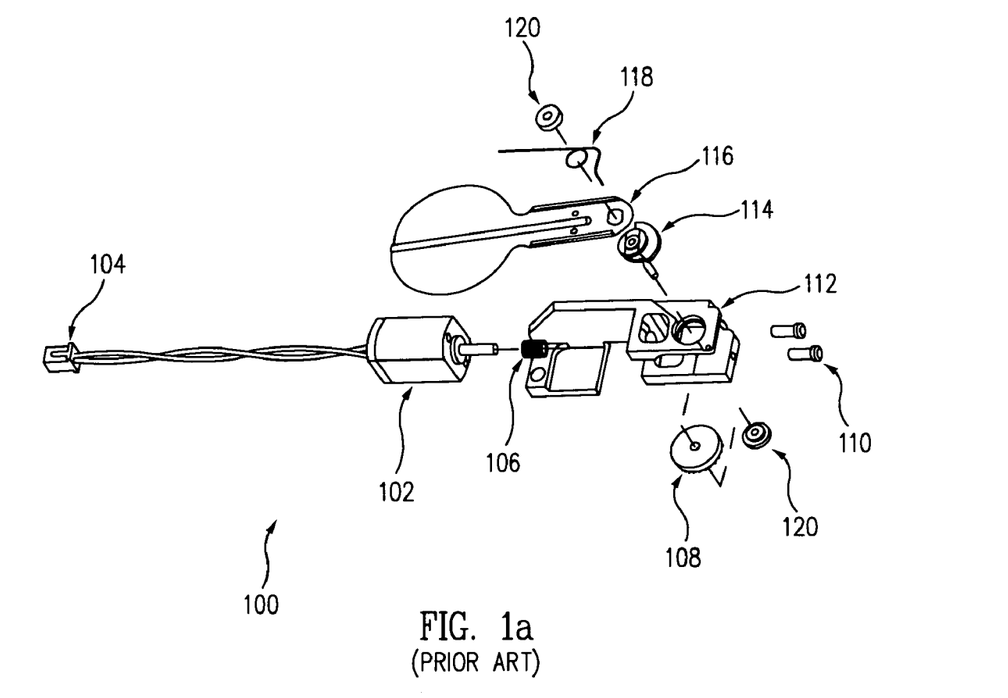
FIGS. 1a and 1b show an exploded perspective view and a top view, respectively, of a conventional camera shutter mechanism.
Figure 1B:
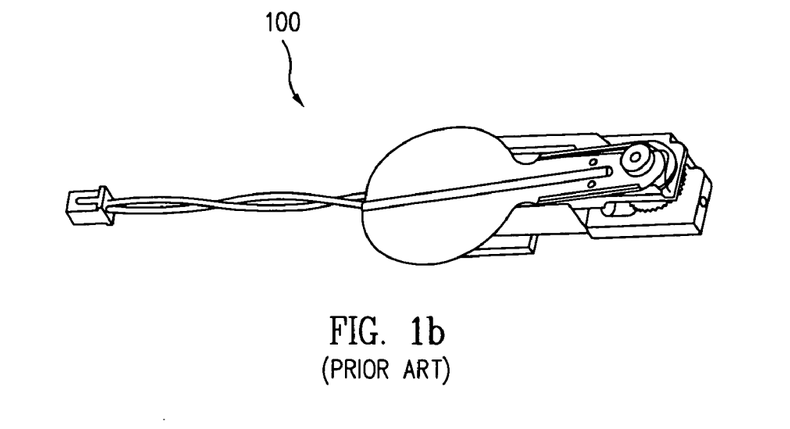

As an example, FIGS. 1a and 1b show an exploded perspective view and a top view, respectively, of a conventional infrared camera shutter mechanism 100. Camera shutter mechanism 100 includes a motor 102, a wiring harness 104, a metal pinion gear 106, a metal face gear 108, a metal gearbox 112, a metal shaft 114, a paddle 116 (also known as a shutter), a torsional spring 118, and inserts 120. Motor 102 receives power via wiring harness 104 to rotate pinion gear 106, which rotates shaft 114 via face gear 108 to move paddle 116 (e.g., into an open or closed shutter position). Torsional spring 118 functions as an anti-vibration spring to act directly against paddle 116. The various components of camera shutter mechanism 100 are secured within or to gearbox 112 by fasteners 110 (e.g., metal bolts) and inserts 120, which are pressed onto shaft 114.

In general, it is desirable for a camera shutter mechanism to possess certain features or functions, such as low cost and ease of manufacture, small and lightweight, low power requirements, and reliable over an extended period of time, frequency of use, or wide temperature range. As an example, camera shutter mechanism 100 may be relatively difficult to manufacture, with certain labor intensive and expensive manufacturing processes. As a result, there is a need for improved techniques for providing a camera shutter mechanism.

SUMMARY

Systems and methods are disclosed herein to provide a camera shutter mechanism. For example, in accordance with an embodiment of the present invention, a camera shutter mechanism is disclosed for an infrared camera which may provide improvements over conventional camera shutter mechanisms in terms of manufacturing ease, cost, weight, power requirements, and/or reliability. The camera shutter mechanism may employ snap-fit techniques and design features which provide performance improvements over conventional devices.

More specifically, in accordance with one embodiment of the present invention, a camera shutter mechanism includes a motor; a pinion gear coupled to the motor; a gear shaft formed with an integral gear adapted to be turned by the pinion gear, wherein the gear shaft is further formed with one or more heat-stake posts; and a paddle coupled to the gear shaft by the heat-stake posts.

In accordance with another embodiment of the present invention, a camera includes a paddle; a motor having a pinion gear; a gear shaft, coupled to the paddle, formed with a self-lubricating gear adapted to be moved by the pinion gear; and a return spring coupled to the gear shaft.

In accordance with another embodiment of the present invention, a method of making a camera shutter mechanism includes installing a motor into a housing of the camera shutter mechanism; heat-staking a gear shaft to a paddle to form a gear shaft/paddle combination; and installing the gear shaft/paddle combination into the housing.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

FIGS. 2a, 2b, 2c, 2d, and 2e show an exploded perspective view, a bottom view, a side view, a top view, and an end view, respectively, of a camera shutter mechanism 200 in accordance with an embodiment of the present invention. Camera shutter mechanism 200 includes a motor 202, a pinion gear 204, a cap 206, a spring 208, a gear shaft 212, a housing 214, a washer 216, pins 218, and a paddle 220.

Motor 202 may be a direct current motor similar to motor 102 (FIG. 1) and have power supply wiring similar to wiring harness 104 of motor 102. The wiring harness connected to motor 202, for example, may be a twisted pair with heat-shrink tubing utilized to cover exposed wire leads and terminals of motor 202. Motor 202 turns pinion gear 204 (e.g., press-fit onto a shaft of motor 202), which engages a gear (e.g., a bevel gear or a face gear) of gear shaft 212 to move paddle 220. For example, paddle 220 may be moved into or out of an optical path of an imaging detector (e.g., an infrared detector) of a camera (i.e., any type of imaging device or system) incorporating camera shutter mechanism 200.

Spring 208 resides on gear shaft 212 to minimize the movement of paddle 220 under external vibrations (e.g., anti-vibration spring) and function as a holding spring to hold paddle 220 in a default position (e.g., an open position during camera operation). An adhesive 210, such as for example Loctite 380 (black max) adhesive or a generic cyanoacrylate adhesive, may be applied to spring 208 to secure it to a desired location on gear shaft 212.

Pinion gear 204, cap 206, gear shaft 212, and housing 214 may be made of molded plastic to permit low-cost molding and ease of assembly. For example, pinion gear 204 and gear shaft 212 may be made of nylon, while cap 206 and housing 214 may be made of polycarbonate. Gear shaft 212 may be implemented as a self-lubricated nylon shaft/gear combination having a bevel gear configuration, with a built-in high-precision rotational stop 224 aligned to impact a protrusion on housing 214. Spring 208 is designed to function with gear shaft 212 as an integral return torsional spring.

Gear shaft 212 includes a number of heat-stake posts 222 (e.g., two in this exemplary embodiment made of nylon), which are inserted or pressed through paddle 220 and melted during the manufacturing process to connect paddle 220 to gear shaft 212. For example, heat-stake posts 222 form mushroom-shaped heat-stake joints to firmly connect paddle 220 to gear shaft 212. Washer 216 (e.g., a reinforcing retaining ring made of stainless steel) may be included to strengthen the connection between paddle 220 and gear shaft 212 and also provide support for an area of paddle 220 around the connection.

Figure 2A:
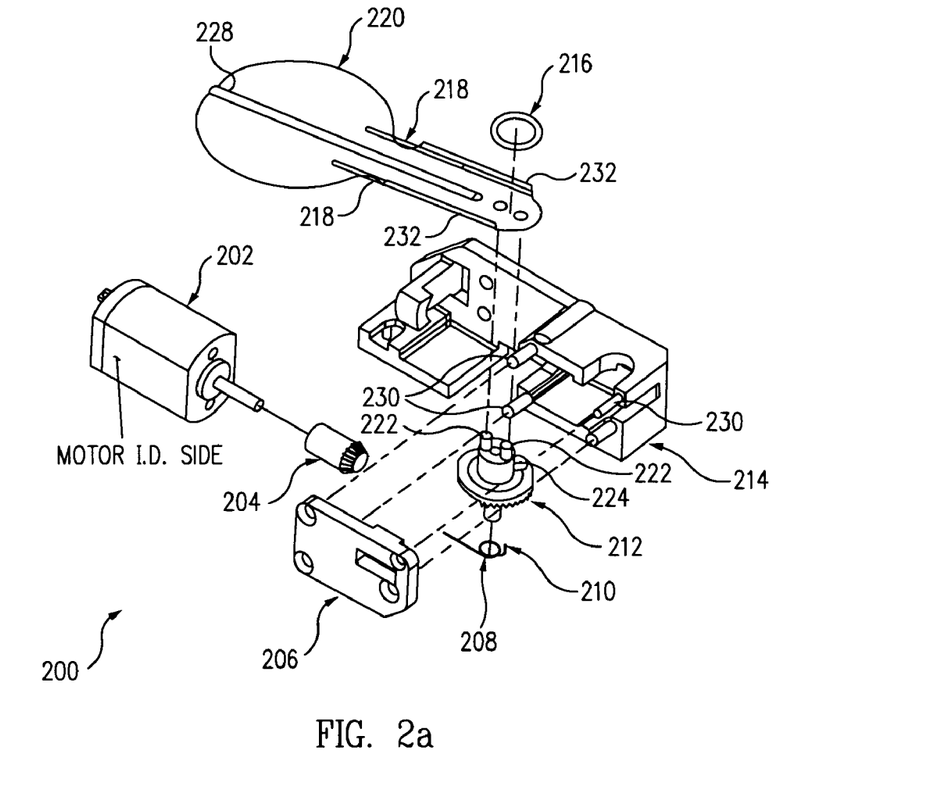
FIGS. 2a, 2b, 2c, 2d, and 2e show an exploded perspective view, a bottom view, a side view, a top view, and an end view, respectively, of a camera shutter mechanism in accordance with an embodiment of the present invention.
Figure 2B:
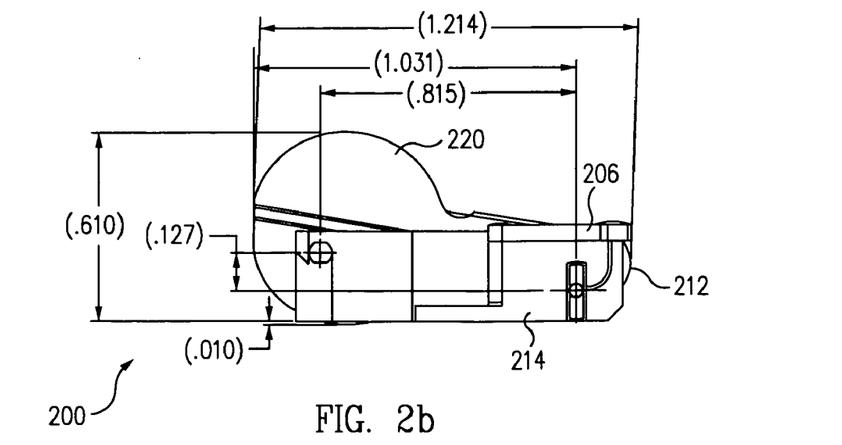
Figure 2C:
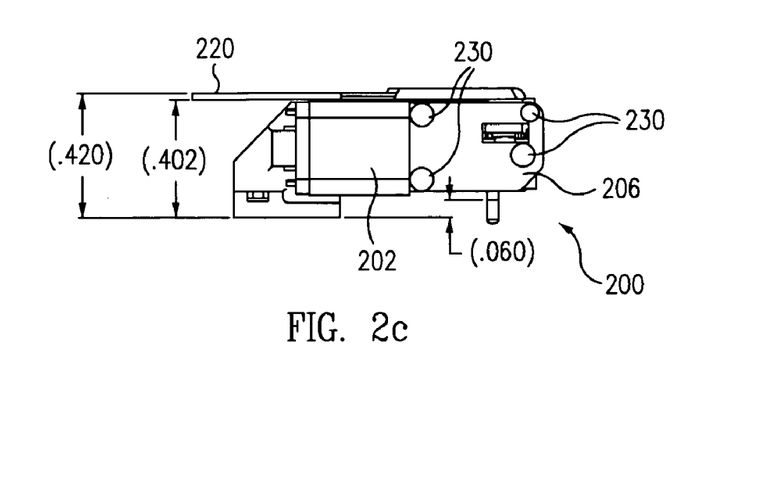
Figure 2D:
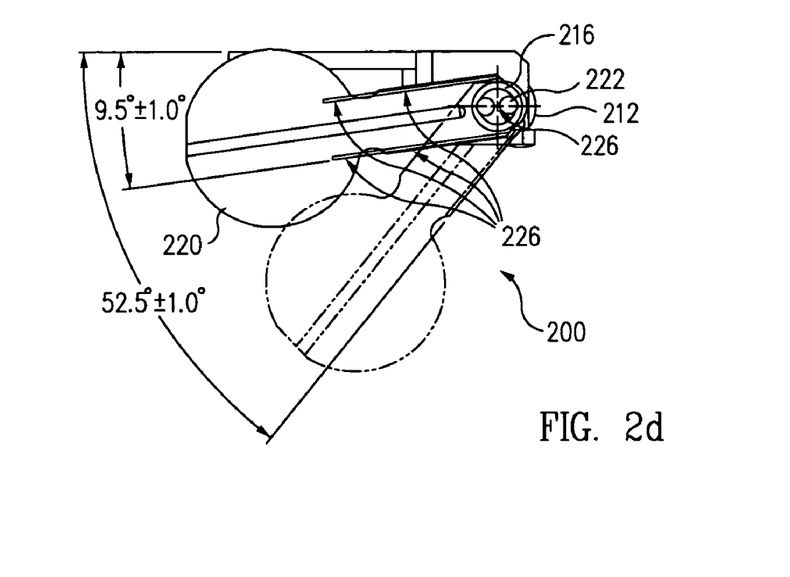
Figure 2E:
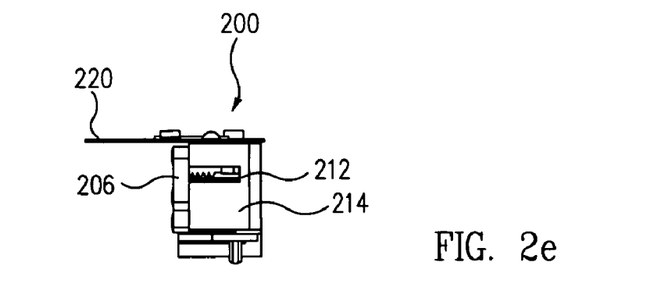

For example, FIG. 2d illustrates heat-stake posts 222 forming a joint with washer 216 and paddle 220, with heat-stake posts 222 overlapping washer 216 to provide a firmer connection between paddle 220 and gear shaft 212. An adhesive 226, such as for example Loctite 352 ultraviolet curable adhesive or Loctite 3101 ultraviolet curable adhesive, may be applied on top of the joint formed by heat-stake posts 222 (of gear shaft 212), paddle 220, and washer 216 to further strengthen and solidify the connection of these elements.

Paddle 220 (e.g., FIG. 2a) may, for example, be any desired shape and made of plastic or aluminum (e.g., 0.003" thin aluminum), with aluminum selected if paddle 220 is employed as a calibration flag to provide thermal calibration of a detector of the camera as known by one skilled in the art. For example, paddle 220 may be made of aluminum and have a low reflection matte black anodized surface to provide a uniform temperature across paddle 220 and serve as a calibration flag for an infrared detector of the camera incorporating camera shutter mechanism 200. Thus, motor 202 would drive pinion gear 204 and gear shaft 212 to rotate paddle 220 into the optical path when calibration is desired.

Paddle 220 may be strengthened, for example, by including at least one rib 228 to stiffen and maintain a flat surface on paddle 220. Thus, paddle 220, for example, may be a stamped/formed paddle manufactured on a progressive die. Paddle 220 may also be supported (in addition to rib 228 or instead of rib 228) by pins 218, which for example, are inserted into corresponding curved edges 232 of paddle 220. Pins 218 may be made of thin rods or music wire (e.g., dimensions of 0.010" in diameter by 0.35" in length) and further secured to paddle 220 by adhesive 226 (e.g., at certain areas as illustrated in FIG. 2d).

The various components of camera shutter mechanism 200 are secured within or to the enclosure (at least partial enclosure) formed by cap 206 and housing 214, with cap 206 secured to housing 214 by a heat-staking operation via posts 230. As an example, camera shutter mechanism 200 may be assembled as described in the following operations. First, a wiring harness is attached to motor 202 and gear shaft 212 is press fit onto paddle 220. Washer 216 is installed over heat-stake posts 222 and onto paddle 220 and then washer 216 and paddle 220 are heat staked onto gear shaft 212.

Adhesive 226 is applied to paddle 220, washer 216, and gear shaft 212 at the joint (e.g., to encapsulate the area or union). Pins 218 are inserted into paddle 220 and adhesive 226 is applied to secure pins 218 to paddle 220. Spring 208 is installed onto gear shaft 212 and one end of spring 208 is bonded or secured to gear shaft 212 (e.g., with adhesive 210). Pinion gear 204 is installed onto a shaft of motor 202 and then motor 202 is installed (e.g., snapped) into housing 214.

Paddle 220 and gear shaft 212, which are heat staked together, are inserted into housing 214, with pinion gear 204 meshing with a gear on gear shaft 212. Cap 206 is installed onto housing 214 by sliding over posts 230 to close the gearbox formed by cap 206 and housing 214. A heat-staking operation is performed by melting the ends of posts 230 to seal the gearbox and secure cap 206 to housing 214. It should be understood that the above operations are exemplary and that, for example, the order of the operations is not limited and the sequence for one or more of the operations may be varied.

Figure 3A:
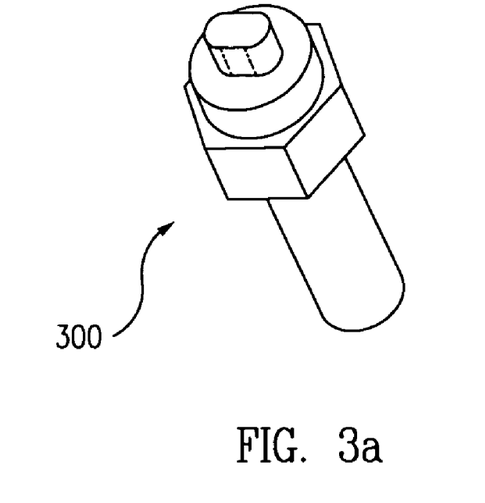
FIGS. 3a and 3b show top perspective views of heat-staking tools for assembling a camera shutter mechanism in accordance with an embodiment of the present invention.
Figure 3B:
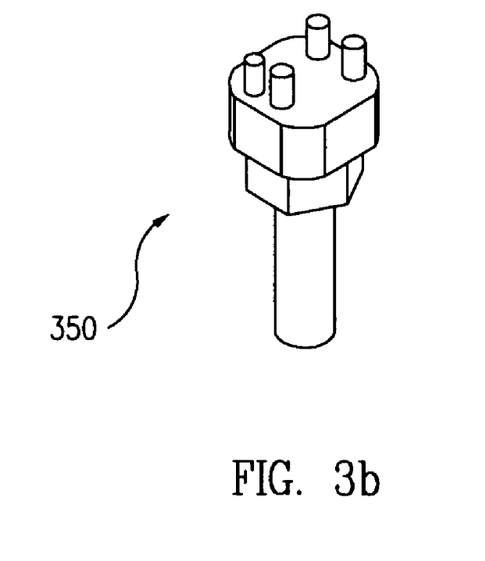

As an example, FIGS. 3a and 3b show top perspective views of heat-staking tools 300 and 350 for assembling a camera shutter mechanism in accordance with an embodiment of the present invention. For example, heat-staking tools 300 and 350 may be employed in the above exemplary assembly operation to melt heat-stake posts 222 and posts 230, respectively. Alternatively, various other techniques for heat-staking, as are known in the art, may be employed to perform any heat-staking operations desired for assembling camera shutter mechanisms discussed herein.

Camera shutter mechanism 200, in accordance with an embodiment of the present invention, provides a mechanical (internal or external) shutter, which may be employed, for example, to calibrate an infrared imaging system (e.g., camera). Paddle 220 of camera shutter mechanism 200 may provide a flat, opaque, and non-reflective paddle (also referred to as a shutter) having a surface with a uniform temperature for providing calibration in the infrared spectrum.

In contrast to some conventional shutter mechanisms, camera shutter mechanism 200 may provide certain advantages in terms of power requirements, size, weight, and/or vibration and shock resistance (e.g., 30 g). Furthermore, camera shutter mechanism 200 may provide a wide operating temperature range (e.g., −40° C. to +85° C.), be highly responsive to electrical commands (e.g., <30 ms), and/or be variable in calibration time (i.e., amount of time paddle 220 is closed during calibration, such as for example, from 50 ms to 300 ms or more), while providing high reliability (e.g., >1 million cycles over a ten year period). In general, techniques disclosed herein for camera shutter mechanism 200 may provide a high-volume production design at a relatively low cost.

FIGS. 4a, 4b, 4c, 4d, 4e, and 4f show an exploded perspective view, a top perspective view, a top view, a side view, an end view, and a partial expanded view, respectively, of a camera shutter mechanism 400 in accordance with an embodiment of the present invention. Camera shutter mechanism 400 is similar to camera shutter mechanism 200 and, therefore, the description of similar features or elements will not be repeated but certain differences will be described.

A paddle 402 may differ from paddle 220 by including two or more ribs 410 (rather than single rib 228), which may run substantially along the length of paddle 402. Ribs 410 further strengthen paddle 402 and may make paddle 402 flatter and easier to manufacture relative to paddle 220 and, therefore, not need support pins, such as pins 218 of paddle 220. For example, paddle 402 may represent a stamped/formed paddle manufactured on a progressive die, with ribs 410 forming double-edged ribs to allow the aluminum to flow more easily during manufacture to yield flatter surfaces and a higher fracture resistance after ribs and heat-stake holes are formed.

Washer 216 may be formed as a retainer 404, with retainer 404 optionally having an opening 408 for attaching a spring (not shown). The spring may serve the function of spring 208 (e.g., return torsional spring), which would no longer be needed, or the spring (e.g., an over-center anti-vibration spring) may hold paddle 402 open or closed. For example, paddle 402 may be closed during calibration or non-operational modes of the camera incorporating camera shutter mechanism 400 (e.g., to protect the camera's infrared detector or microbolometer array from solar radiation).

Figure 5:
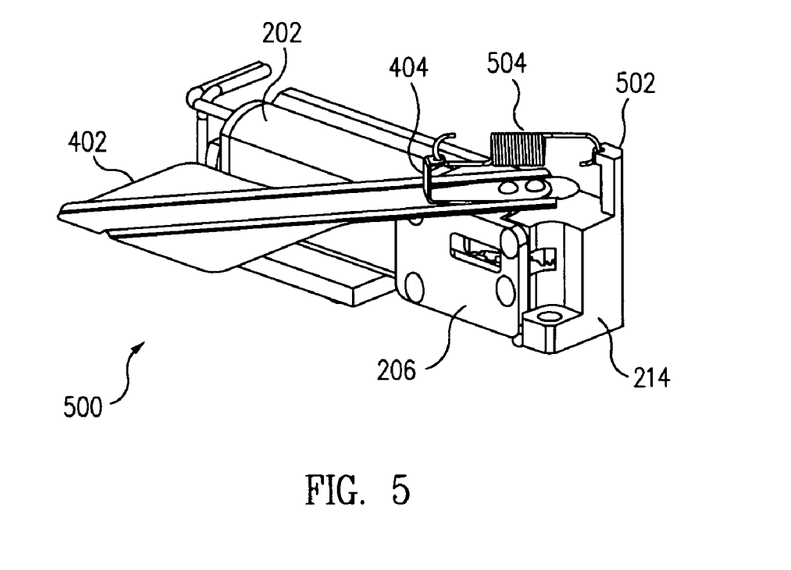
FIG. 5 shows a top perspective view of a camera shutter mechanism in accordance with an embodiment of the present invention.

Housing 214 may be designed with an area (e.g., an integral post) for attaching the spring so that the spring is coupled between retainer 404 and the area of housing 214. For example, FIG. 5 illustrates a camera shutter mechanism 500 in accordance with an embodiment of the present invention. Camera shutter mechanism 500 may be viewed as an exemplary embodiment of camera shutter mechanism 400, but having an integral post 502 on housing 214 for attaching a spring 504 between post 502 and retainer 404.

Figure 6:
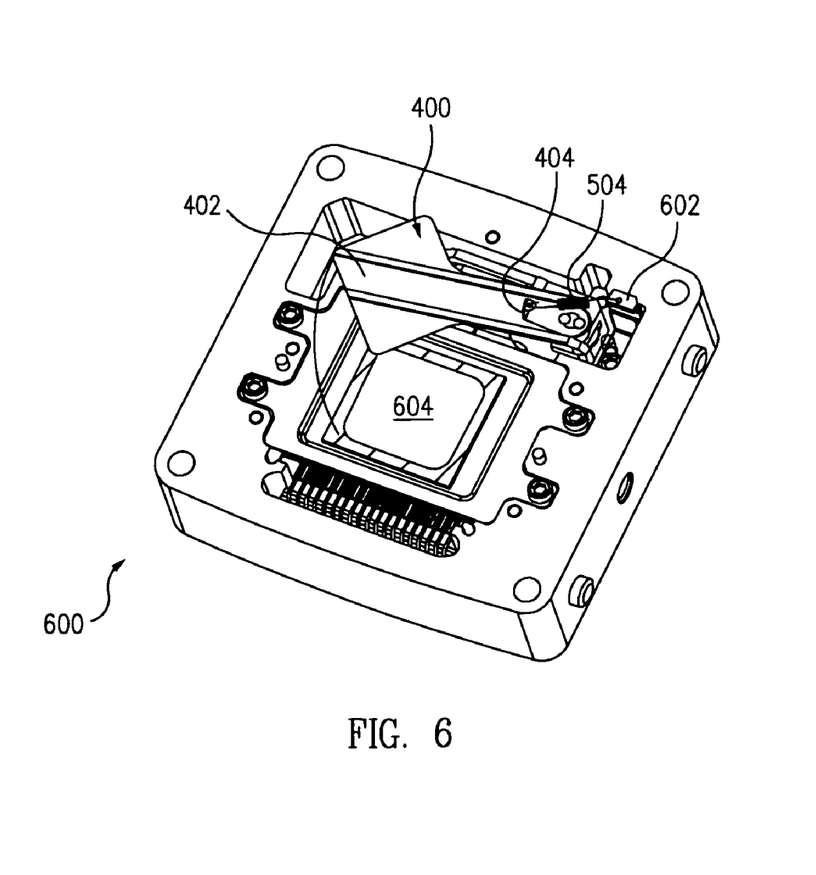
FIG. 6 shows a top perspective view of a camera incorporating a camera shutter mechanism in accordance with an embodiment of the present invention.

Alternatively, the camera incorporating camera shutter mechanism 400 may have, for example, an internal hook for attaching the spring so that the spring is coupled between retainer 404 and the internal hook of the camera. For example, FIG. 6 shows an exemplary camera 600 (or portion of a camera) incorporating camera shutter mechanism 400 in accordance with an embodiment of the present invention. Camera 600 includes an attachment point 602 (e.g., an opening) to allow spring 504 to be attached between attachment point 602 and retainer 404. As an example, camera 600 may represent an infrared camera having an infrared detector 604. Paddle 402 of camera shutter mechanism 400 may be moved (as indicated in FIG. 6) to cover infrared detector 604, as discussed herein, such as during calibration periods or to prevent external thermal radiation from reaching infrared detector 604. Camera 600 may include additional components, such as a lens and a housing cover (as known in the art), which are not shown so as to clearly illustrate camera shutter mechanism 400 within camera 600.

Figure 4A:
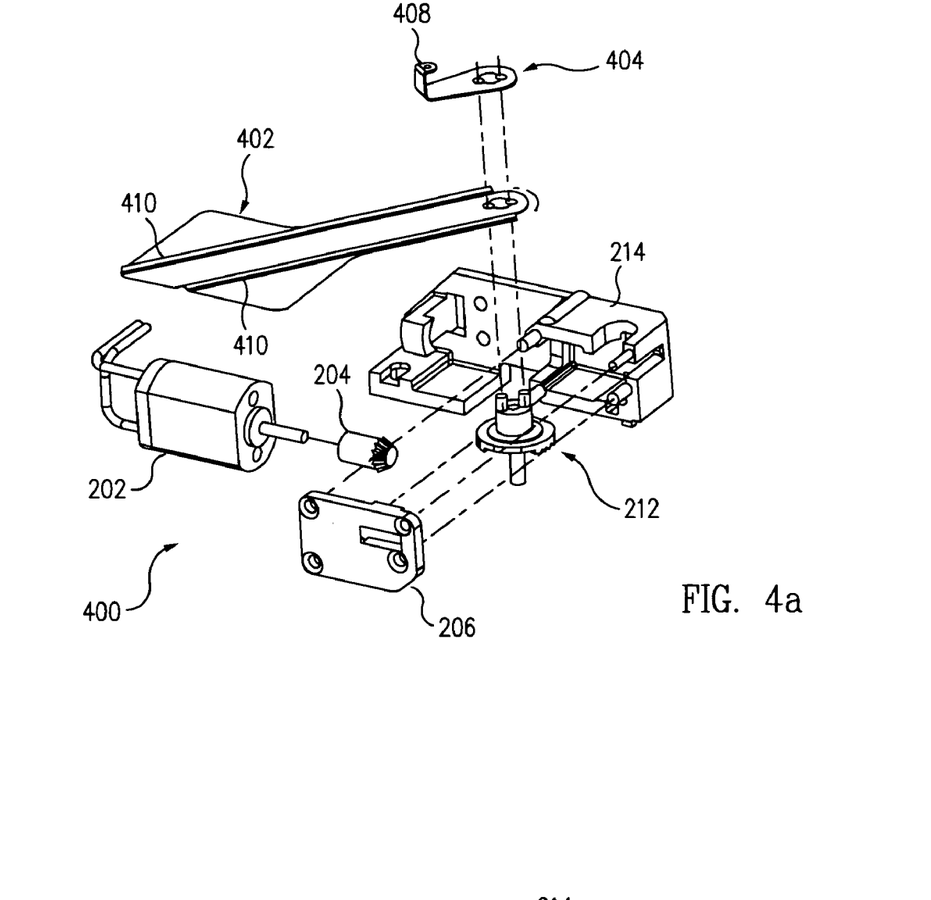
FIGS. 4a, 4b, 4c, 4d, 4e, and 4f show an exploded perspective view, a top perspective view, a top view, a side view, an end view, and a partial expanded view, respectively, of a camera shutter mechanism in accordance with an embodiment of the present invention.
Figure 4B:
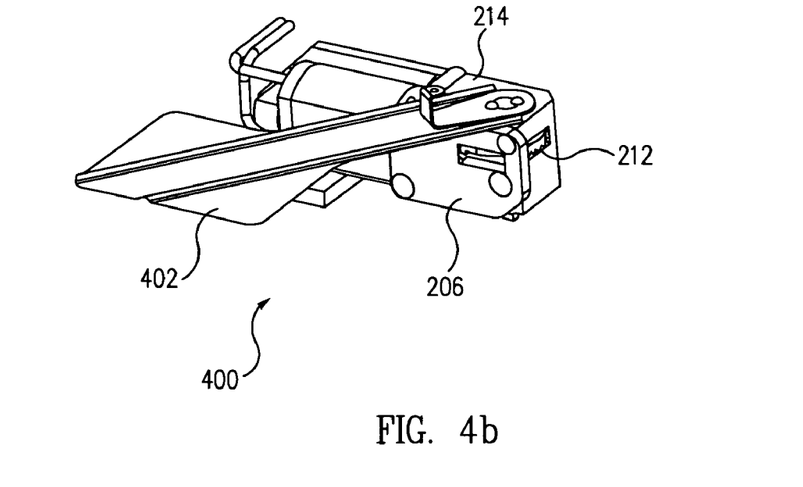
Figure 4C:
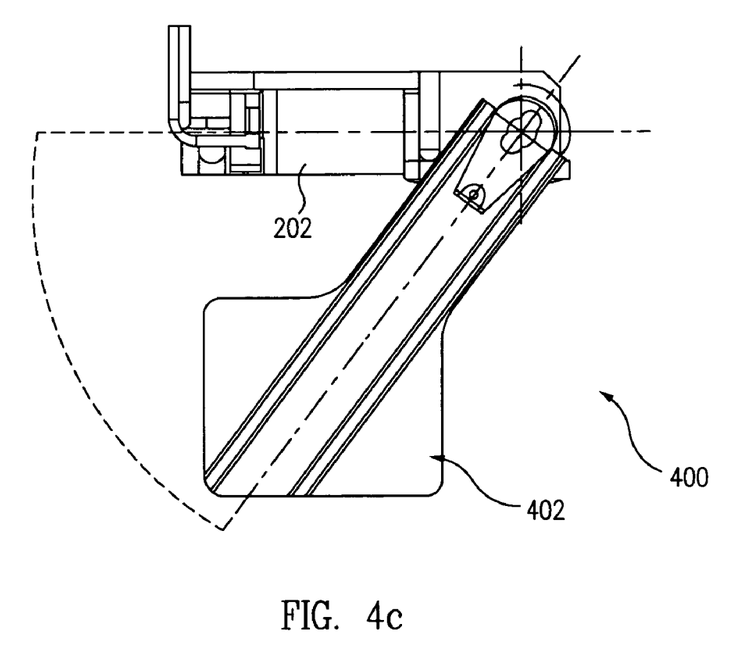
Figure 4D:
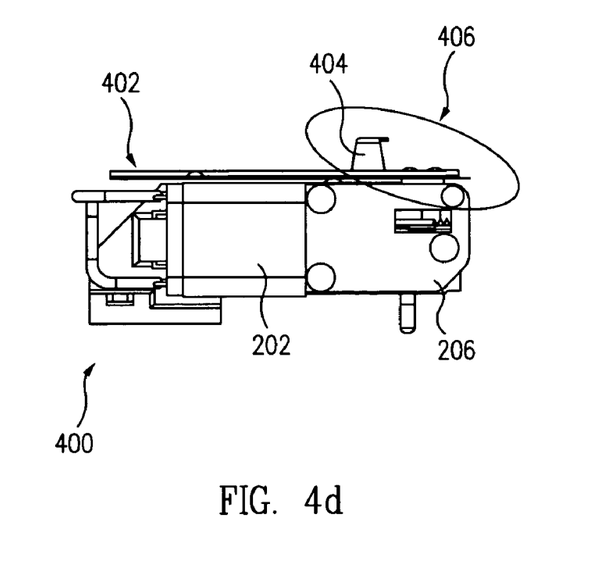
Figure 4E:
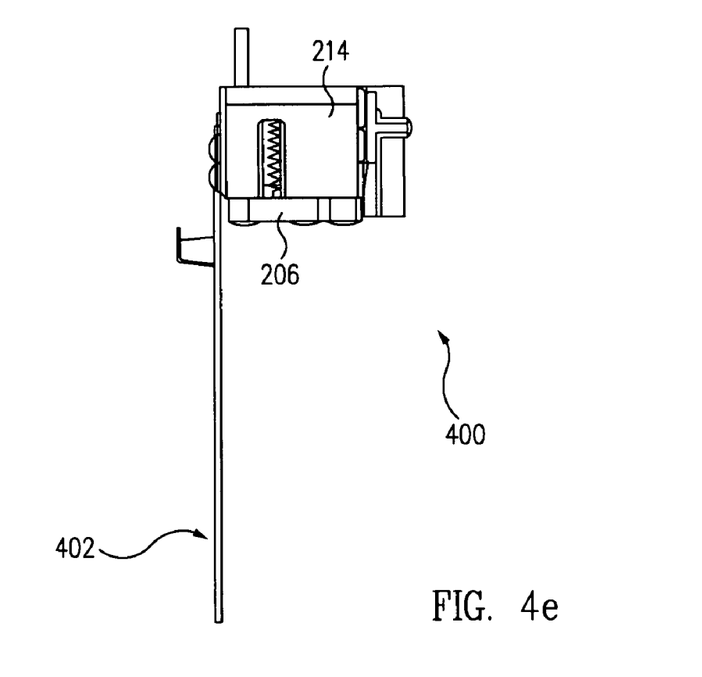
Figure 4F:
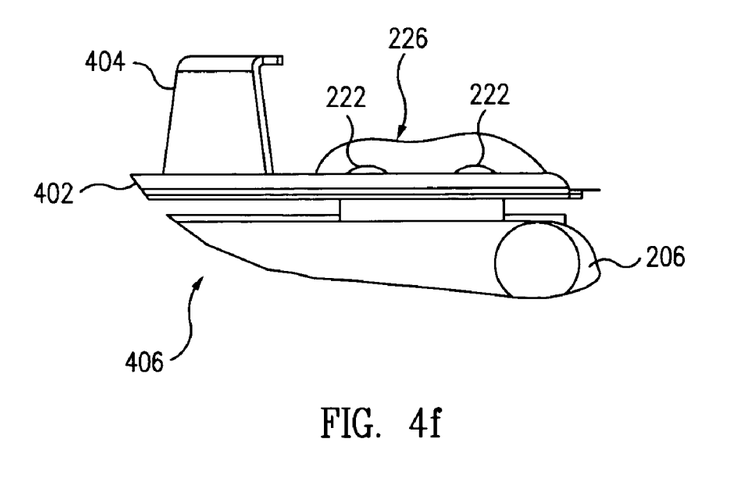

Returning to FIGS. 4a–4f, retainer 404 and paddle 402 may be heat-staked to gear shaft 212 in a similar manner as explained herein for camera shutter mechanism 200 utilizing washer 216 and paddle 220. Adhesive 226 may also be applied to strengthen the connection between gear shaft 212 and paddle 402 and retainer 404. For example, an enlarged view of an area 406 in FIG. 4d is illustrated in FIG. 4f to illustrate a possible exemplary application of adhesive 226. In this example shown in FIG. 4f, after the heat-stake assembly operation, adhesive 226 is applied to encapsulate heat-stake posts 222 and a portion of paddle 402 and retainer 404. If a spring is to be attached to retainer 404, adhesive 226 must be applied in a manner so as to not interfere with the spring's movement (i.e., adhesive 226 must allow clearance for the spring).

In accordance with one or more embodiments of the present invention, camera shutter mechanisms are disclosed which may provide certain advantages over conventional camera shutter mechanisms. For example, a camera shutter mechanisms gears, shaft, and various other components may be manufactured from plastic to provide certain advantages, such as low-cost molding, self-lubrication, and ease of assembly. Furthermore, heat-staking, snap-fit features, and adhesives (e.g., ultraviolet (UV) cure adhesive) may be employed to reduce or eliminate mechanical fasteners (e.g., bolts).

An internal (hidden) return spring may also be employed for ease of assembly and which may provide lower sensitivity and improved angular tolerance control than conventional techniques. In addition, an assembly sequence for the camera shutter mechanism may provide improved precision and may offer less manufacturing sensitivity. In general, techniques disclosed herein may provide a camera shutter mechanism that is less expensive, more reliable, smaller, lighter, and/or that consumes less power than conventional shutter mechanisms.

Embodiments described above illustrate but do not limit the invention. It should also be understood that numerous modifications and variations are possible in accordance with the principles of the present invention. Accordingly, the scope of the invention is defined only by the following claims.

We claim:

1. A camera shutter mechanism comprising:
   a motor;
   a pinion gear coupled to the motor;
   a gear shaft singularly formed with an integral gear adapted to be turned by the pinion gear, wherein the gear shaft is further singularly formed with one or more heat-stake posts and a precision stop;
   a paddle coupled to the gear shaft by the heat-stake posts; and
   a housing adapted to at least partially enclose the motor, the pinion gear, and the gear shaft, wherein the housing includes a cap secured to the housing by heat-stake posts formed as part of the housing and wherein the precision stop impacts the housing at a first position.

2. The camera shutter mechanism of claim 1, wherein the pinion gear and the gear shaft are made of plastic.

3. The camera shutter mechanism of claim 1, wherein the pinion gear is coupled to the motor by press-fitting the pinion gear onto a shaft of the motor.

4. The camera shutter mechanism of claim 1, wherein the cap and the housing are made of plastic.

5. The camera shutter mechanism of claim 1, wherein the integral gear of the gear shaft comprises a bevel gear or a face gear.

6. The camera shutter mechanism of claim 1, further comprising a spring coupled to the gear shaft by an adhesive.

7. The camera shutter mechanism of claim 1, further comprising a washer coupled to the paddle and the gear shaft by the heat-stake posts of the gear shaft.

8. The camera shutter mechanism of claim 7, wherein the washer is adapted to couple to a spring attached to at least one of the housing and a camera incorporating the camera shutter mechanism.

9. The camera shutter mechanism of claim 1, further comprising support pins coupled to the paddle by an adhesive.

10. The camera shutter mechanism of claim 1, further comprising an adhesive applied at a joint formed by the heat-stake posts of the gear shaft and the paddle.

11. The camera shutter mechanism of claim 1, further comprising at least one double-edged rib extending a length of the paddle.

12. The camera shutter mechanism of claim 1, wherein the camera shutter mechanism is formed as part of an imaging system.

13. A camera comprising:

a paddle;

a motor having a pinion gear;

a gear shaft, coupled to the paddle, formed with a self-lubricating gear adapted to be moved by the pinion gear, wherein the gear shaft and the gear are integrally and singularly formed from plastic and include heat-stake posts which couple the paddle to the gear shaft;

a retainer coupled to the paddle by the heat-stake posts; and a retainer spring coupled to the gear shaft via the retainer.

14. The camera of claim 13, wherein the gear comprises a bevel gear or a face gear.

15. The camera of claim 14, further comprising a housing adapted to at least partially enclose the gear shaft, wherein the housing and the pinion gear are made of plastic.

16. The camera of claim 15, wherein the housing includes heat-stake posts and a cap secured to the housing by the heat-stake posts.

17. The camera of claim 13, wherein a first adhesive is applied to a joint formed by the gear shaft and the paddle.

18. A method of making a camera shutter mechanism, the method comprising:

installing a motor into a housing of the camera shutter mechanism, wherein the motor includes a first gear;

heat-staking a gear shaft to a paddle and a retainer to form a gear shaft/paddle combination, wherein the gear shaft is singularly formed with a second gear and a precision stop; and installing the gear shaft/paddle combination into the housing such that the first gear meshes with the second gear.

19. The method of claim 18, further comprising:

attaching a wiring harness to the motor;

press-fitting the first gear gear onto the motor; and applying an adhesive to a joint formed by the heat-staking of the gear shaft to the paddle.

20. The method of claim 19, further comprising heat-staking a cap onto the housing.

21. The method of claim 18, wherein the retainer strengthens a joint formed by the gear shaft and the paddle.

22. The method of claim 18, further comprising:

attaching pins to the paddle to strengthen the paddle; and attaching a spring to the gear shaft.

* * * * *

UNITED STATES PATENT AND TRADEMARK OFFICE
CERTIFICATE OF CORRECTION

PATENT NO.       : 6,929,410 B2
APPLICATION NO. : 10/745368
DATED            : August 16, 2005
INVENTOR(S)      : Vu Nguyen et al.

Page 1 of 1

It is certified that error appears in the above-identified patent and that said Letters Patent is hereby corrected as shown below:

Claim 13, Column 7, line 17 delete "retainer" first occurance and insert --return--

Signed and Sealed this

Seventh Day of November, 2006

JON W. DUDAS
*Director of the United States Patent and Trademark Office*